United States Patent [19]

Dennany, Jr. et al.

[11] Patent Number: 5,069,424
[45] Date of Patent: Dec. 3, 1991

[54] QUICK CONNECTOR

[75] Inventors: Robert Dennany, Jr., Lapeer; Ken Randall, Sterling Heights, both of Mich.

[73] Assignee: ITT Corporation, New York, N.Y.

[21] Appl. No.: 599,214

[22] Filed: Oct. 17, 1990

[51] Int. Cl.$^5$ ............................................. F16L 37/00
[52] U.S. Cl. .............................. 251/149.6; 251/149.1; 285/319; 285/921
[58] Field of Search .................... 251/149.1, 149.6; 285/319, 921

[56] References Cited

U.S. PATENT DOCUMENTS

| | | | |
|---|---|---|---|
| 3,234,965 | 2/1966 | Anderson | 285/319 |
| 4,373,753 | 2/1983 | Ayers et al. | 285/319 |
| 4,667,925 | 5/1987 | Gaita | 251/149.1 |
| 4,681,351 | 7/1987 | Bartholomew | 285/921 |
| 4,756,558 | 7/1988 | Beamer | 285/921 |
| 4,781,400 | 11/1988 | Cunningham | 285/319 |
| 4,913,467 | 4/1990 | Washizu | 285/319 |

Primary Examiner—A. Michael Chambers
Attorney, Agent, or Firm—Robert P. Seitter; J. Gordon Lewis

[57] ABSTRACT

A quick connect connector for fast connection of fluid carrying assemblies such as a mating tube and a fluid unit. The connector includes a connector body which houses the connector components and accepts a redundant clip which pushes an upset bead of the male tube toward an annular seal which surrounds the end of the male tube. The redundant clip includes fingers which are received within an external groove on the connector body when the tube head is in the fully locked position within the housing. The fingers of the redundant clip proved a secondary locking feature in the event that the locking fingers of a primary locking within the connector body should fail. The position of the redundant clip provides a visual indication of a positive lock of the connector. The forward end of the annular seal within the connector body includes a unidirectional shut-off valve of duckbill seal which precludes outflow from the connector in the event of unintended or accidental disconnection of the mating tube from the connector.

24 Claims, 4 Drawing Sheets

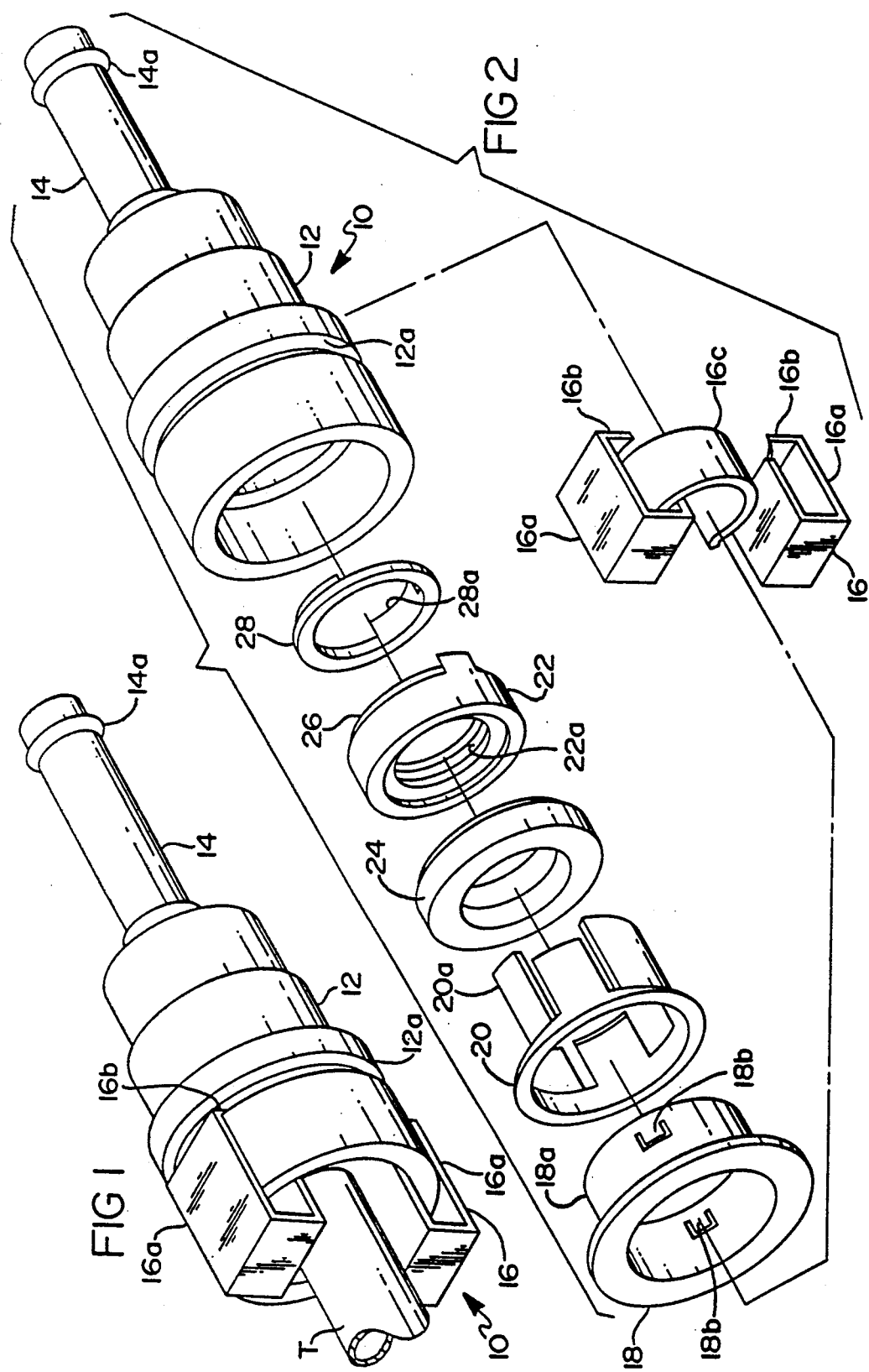

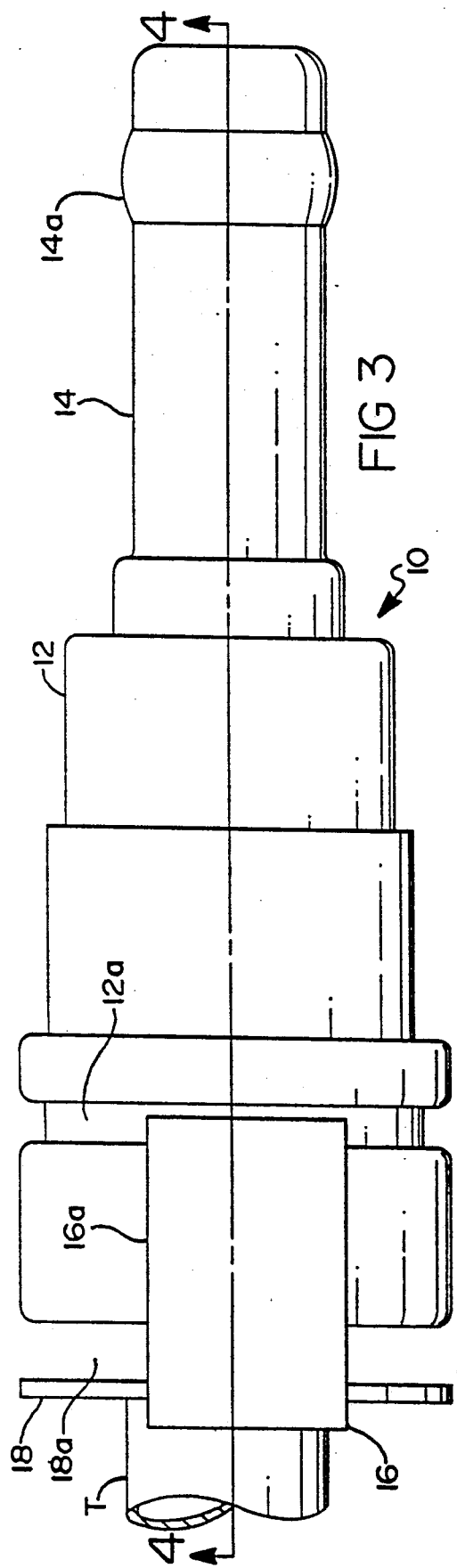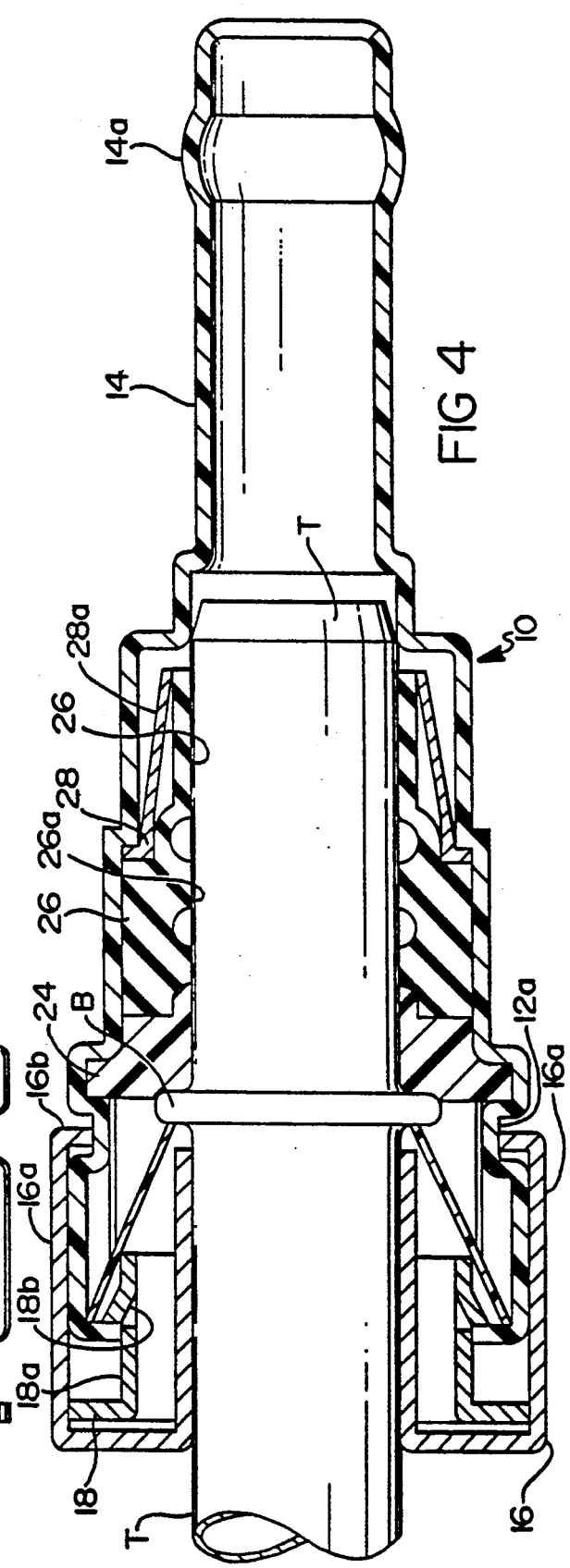

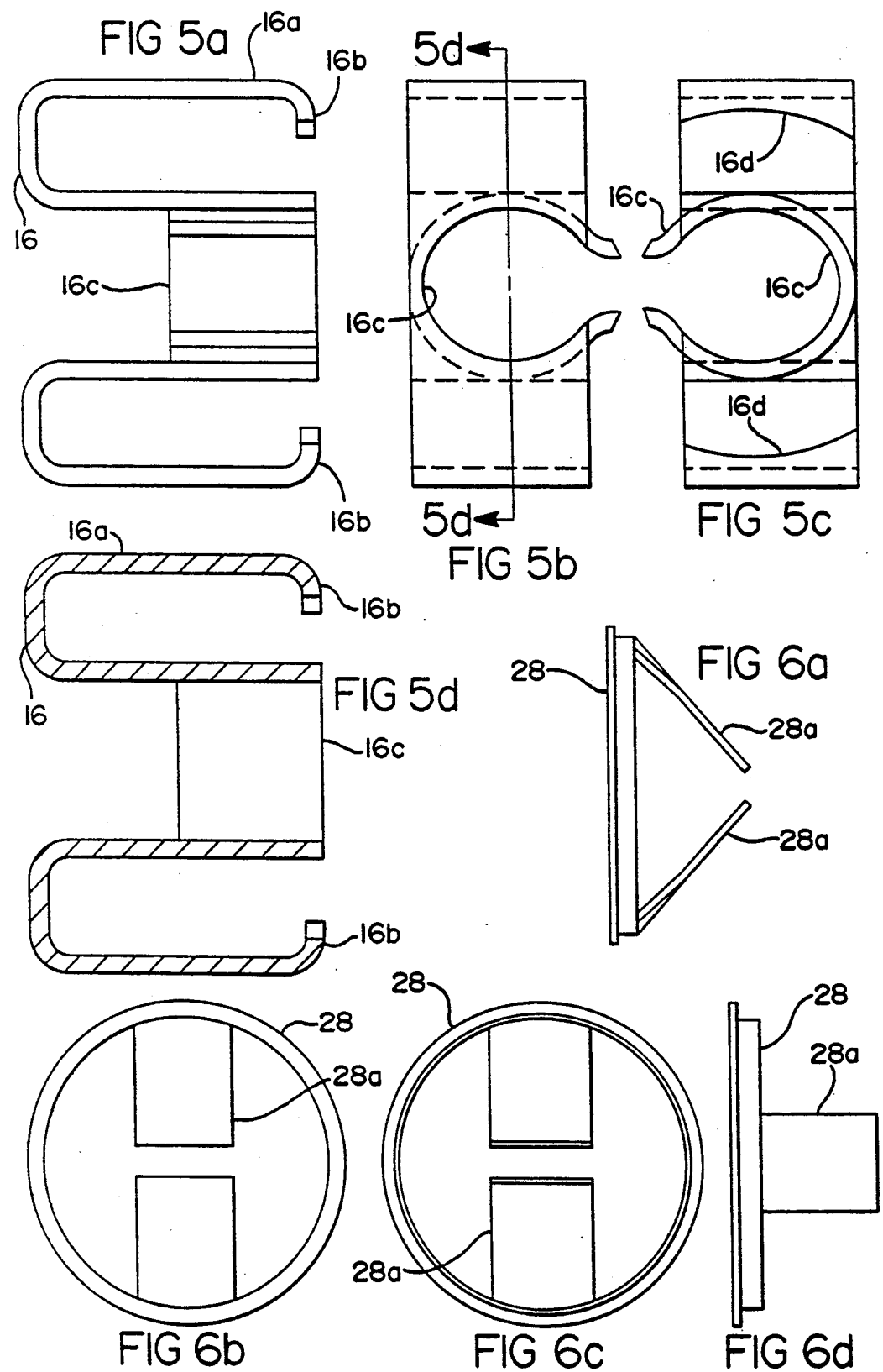

QUICK CONNECTOR

BACKGROUND OF THE INVENTION

This invention relates to a connector for fast connection of a mating tube to a fluid assembly, and, more particularly, to such a device for providing a snap-in connection with a visual indication thereof and means for preventing accidental outflow during disconnection.

Quick connectors are known and have been widely used in the art and are used in fluid carrying assemblies such as are used at automobile assembly plants and service centers. More recently, these connectors have been provided in the form of a unitary connector body which is joined with the male end of a mating tube. The recent connectors utilize either a pair of O-rings or a one piece seal with multiple ribs. The O-rings or ribs surround the inserted male end of the mating tube. These recent connectors utilize only a single clip to retain the male mating tube in place within the connector body. These connectors have the disadvantage that if an accidental disconnection occurs, fluid continues to flow out of the connector body. This is a major problem These connectors have the further disadvantage that an indication as to whether a proper locked connection has been provided is not readily apparent.

These and other disadvantages are overcome by the present invention wherein a quick connector is provided for fluid application such as for use with a gas or a liquid. The connector provides a second or redundant clip which provides a back-up retaining function and a visual external indication of a positive or properly-assembled locking of the connector and mating tube. Further, a unidirectional shut-off valve seal is provided which precludes outflow from the connector upon unintended or accidental disconnection of the mating tube from the connector.

SUMMARY OF THE INVENTION

Briefly, a connector for connecting a mating tube to a fluid assembly is provided. The connector comprises a connector housing having a first end for receiving a mating tube and a second end for terminating the housing into a fluid device. A generally annular seal is provided in the housing between the first and second ends for sealingly engaging the mating tube. A primary retaining clip is provided in the housing between the first end and the seal. The retaining clip includes at least one inwardly directed resilient finger for engaging the mating tube to retain the mating tube in the housing. A release cap is provided for enclosing the first end of the housing, and for receiving the mating tube therethrough.

In a first particularly advantageous form of the invention, a unidirectional valve is provided in the housing between the seal and the second end of the housing to block fluid flow through the housing toward the end thereof when the mating tube disengages the seal. In a second particularly advantageous form of the connector in accordance with the principles of the present invention, a secondary retaining clip extends into the housing between the release cap and the mating tube. The secondary retaining clip includes means for engaging a portion of the housing tube releaseably lock the secondary retaining clip to the housing.

BRIEF DESCRIPTION OF THE DRAWINGS

The advantages of this invention will become more readily appreciated as the same becomes completely understood by reference to the following detailed description when taken in conjunction with the accompanying drawing wherein:

FIG. 1 is a partial assembly view of the quick connector in accordance with the teachings of the present invention;

FIG. 2 is an exploded view illustrating the major components of tne connector of FIG. 1;

FIG. 3 is a plan view of the connector in accordance with the previous drawing figures;

FIG. 4 is a cross-sectional view taken along the line 4—4 of FIG. 3;

FIGS. 5a-5d are various views of the secondary retaining clip in accordance with the principles of the present invention;

FIGS. 6a-6d are various views of the unidirectional valve seal clip in accordance with another preferred form of the present invention.

DETAILED DESCRIPTION

Figure 7:
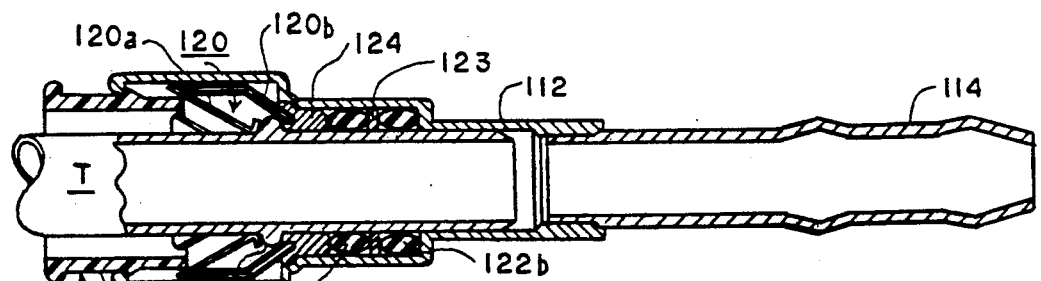
FIGS. 7, 8 and 9a-9c illustrate an alternative embodiment of the present invention.
Figure 8:
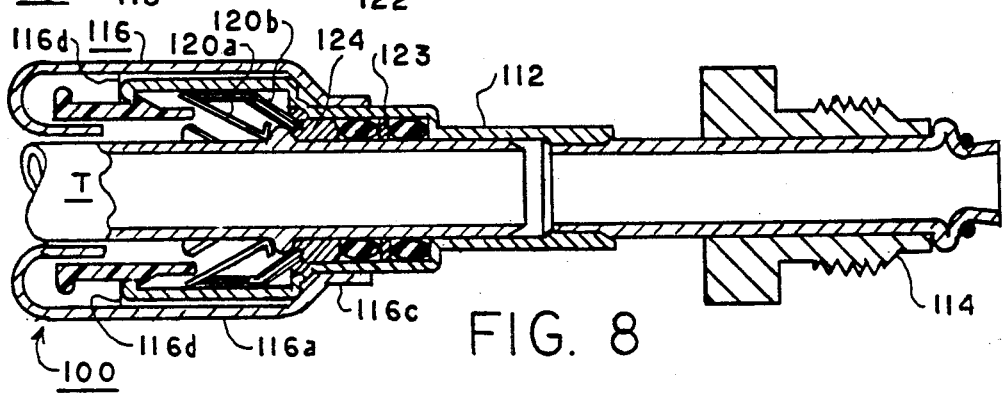
Figure 9A:
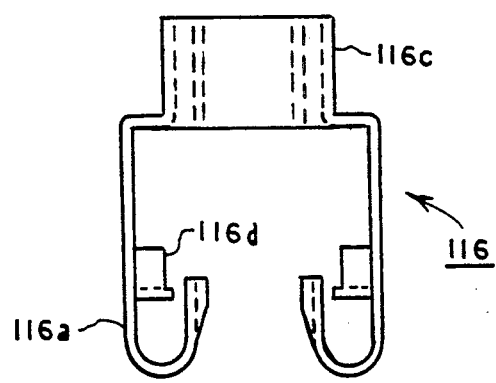
Figure 9B:
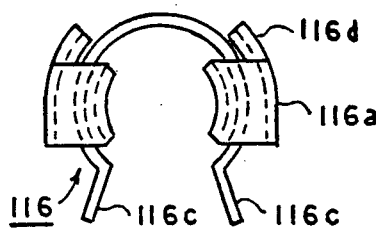
Figure 9C:
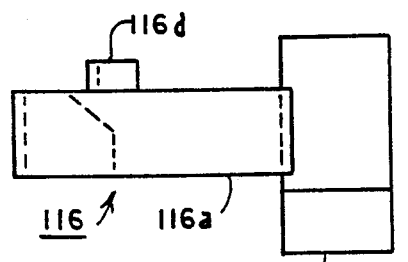

Referring now to FIG. 1, there is shown generally at 10 a partial assembly view of the quick connector in accordance with the present invention. Connector 10 preferably includes a generally tubular connector body or housing 12 which receives a mating tube T through a first end thereof. The other end of the housing 12 includes a terminating portion 14 which may include means for coupling connector housing 12 to a utilization device such as a hose, another tubing section or any other fluid device. As illustrated in FIG. 1, terminating portion 14 may include an upset bead 14a to facilitate connection to a flexible hose or the like. A barbed end portion also may be utilized as is well known in the art. Connector 10 further includes a removable redundant or secondary clip 16 which includes resilient finger portions 16a which, in turn, are provided with inwardly directed portions 16b which are received within an annular groove 12a of housing 12.

Referring now to FIG. 2 there is shown an exploded view of the connector 10 of FIG. 1. Connector 10 in FIG. 2 further includes a release cap 18 having an axially extending tubular portion 18a which includes struck out tabs 18b the function of which will be explained in greater detail hereinafter.

For clarity, release cap 18 is not illustrated in FIG. 1 so as to more clearly illustrate the function and position of secondary clip 16. Further, as more clearly illustrated in FIG. 2, clip 16 includes a holding portion 16c which encircles mating tube T to facilitate the positioning of clip 16. As can be further seen with reference to FIG. 2, the internal components of connector 10 further include a primary retaining clip 20 having a plurality of resilient retaining fingers 20a which project radially inwardly toward the axis of connector 10. As will be explained more fully hereinafter, resilient fingers 20a function to engage the rearward side of an upset bead B of mating tube T to retain and lock tube T within housing 12 of connector 10. Connector 10 further includes a generally annular seal 22 which includes a plurality of radially inwardly directed ribs 22a which sealingly engage the male end of mating tube T. Seal 22 is retained within housing 12 by means of a seal retainer 24 the rear end of which engages the forward facing wall portion of upset bead B as is more clearly illustrated in FIG. 4. The forward end of seal 22 includes an integral unidirectional shut-off valve 26 which may comprise a so-called "duckbill" seal or any other suitable device. Connector 10 further includes a seal clip 28 which includes resilient portions 28a which resiliently urge duckbill valve 26 into its closed position when the forward male end of mating tube T is withdrawn from housing 12.

Referring now to FIG. 3 there is shown a top plan view of connector 10 of the previous drawing figures FIG. 4 is a cross-sectional view taken along the line 4—4 of FIG. 3. It can be seen that FIG. 4 more clearly illustrates the structural relationship and function of the various component parts of connector 10 as illustrated in the previous drawing figures. It can be seen by reference to FIG. 4 that upset bead B engages and is seated against seal retainer 24. Seal retainer 24 holds seal 26 in a corresponding annular chamber of the housing and provides a bearing surface for bead B thereby relieving side loading from seal 22. The function and structure of seal 22 is described in greater detail in the co-pending patent application of R. D. Dennany, Jr., Ser. No. 175,005, filed Mar. 30, 1988, now U.S. Pat. No. 4,915,421 issued Apr. 10, 1990, which is assigned to the same assignee as the present invention and to which reference may be had for a more detailed explanation.

In the operation of assembly of the connector, the male mating tube T is pushed into the housing so that upset bead B deflect fingers 20a of primary retaining clip 20 until bead B is past clip fingers 20a which, due to their resiliency, return to a position to hold bead B in place thereby providing a mechanical lock. In currently preferred practice, secondary retaining clip is held to connector body 12 prior to the assembly operation by means of a flexible tethered strap. During the final stage of assembly, clip 16 is snapped onto tube T at holding portion 16c. Clip 16 is then slid forward into connector 12 thereby ensuring that bead B of Tube T is in the lock position within primary clip 20. During disconnection tabes 16a of clip 16 are deflected from groove 12a to permit sliding of the clip 16 away from groove 12a.

As also can be seen by reference to FIG. 4, release cap 18 provides a releasing action of the fingers 20a of primary retaining clip 20. Release cap 18 and its tubular portion 18a are slidably mounted at the first end of housing 12. The maximum rearward or outward translation of release cap 18 is limited by tabs 18b as illustrated in FIG. 4. When release cap 18 is moved into connector housing 12, release cap 18 spreads fingers 20a of primary retaining clip 20 in an outward manner which thereby releases the tube T and allows the tube to be removed from the connector.

Seal 22 comprises a two-ribbed seal incorporating a duckbill shut-off valve 26. The ribs provide the sealing surfaces which contact the mating tube. The duckbill portion 26 of seal 22 provides the shut-off function of the fluid upon removal of mating tube T. Seal retaining clip 28 provides additional memory to duckbill portion 26 of seal 22 thereby returning seal 26 to its closed condition upon removal of mating tube T.

As illustrated in FIGS. 5a–5d, secondary retaining clip 16 is provided with resilient fingers 16a terminating in radially inward directed portions 16b which are received within groove 12a of housing 12. Terminating portions 16b are provided with radially inwardly directed arcuate portions 16d which engage the floor portions of groove 12a in housing 12. The holding portion 16c is preferably integrally formed with the portions of secondary retaining clip 16 which are inserted into the connector housing between release cap 18 and mating tube T. It will now be appreciate by those skilled in the art that secondary retaining clip 16 provides a visual means ensuring a positive connection and also achieves this indicating function by pushing bead B forward if tube T and bead B are in a transition zone prior to a proper connection. The resilient fingers of secondary retaining clip 16 cannot be received in groove 12a of housing 12 if the tube T is not fully in its locked position. The redundant secondary retaining clip 16 further provides additional locking means for connector 10 in the event that the fingers of primary retaining clip 20 should fail. Further, retaining clip 16 prevents unintentional removal of tube T from connector 10 even if the fingers of primary clip 20 are unintentionally spread by prematurely operating release cap 18.

Finally, referring now to FIGS. 6a–6d, it can be seen that side, back, front and top views of seal retaining clip 28 are illustrated. As illustrated in FIG. 6a, resilient fingers 28a assume an approximately 45 degree angular inclination in their unflexed state. Thus, when tube T is removed from connector 10, resilient fingers 28a ensure a residual memory with regard to the closing function of duckbill seal 26.

It will be appreciated by those skilled in the art that the material of connector 10 in accordance with the present invention can be any suitable material such as a plastic, for example, nylon, a metallic or any other suitable material. It also will be appreciated that the quick connector in accordance with the present invention provides a fast connection of fluid carrying assemblies, for example, at automobile assembly plants and service centers. The redundant secondary retaining clip further facilitates pushing the mating tube bead into its corresponding primary retention clip location in the event that the bead B is in its transition zone between the first end of the connector and the annular seal therein. The connector facilitates disassembly of the connector for service of fuel assemblies as between fuel filters, in-line filters, fuel rails, a tank, fluid harness assemblies and the like. Further, upon accidental disconnection, the fluid of the system will not spill out or outflow from the connector due to the function of the unidirectional shut-off valve.

What has been taught, then, is a quick connector which facilitating, notably, a visual indication of a properly locked assembly and which precludes outflow of fluid due to an accidental disconnection, and which overcomes the disadvantages of the prior art. The form of the invention illustrated and described herein is but a preferred embodiment of these teachings. It is shown as an illustration of the inventive concepts, however, rather than by way of limitation, and it is pointed out that various modifications and alterations may be indulged in within the scope of the appended claims.

What is claimed is:

1. A quick connector for connecting a mating tube to a fluid assembly, said connector comprising, in combination:

a connector housing having a first end for receiving a mating tube and a second end for terminating said housing into a fluid device;

a generally annular seal in asid housing between said first and second ends for sealing engaging said mating tube;

5 a primary retaining clip in said housing between said first end and said seal, said retaining clip having at least one inwardly directed resilient finger for engaging said mating tube to retain said mating tube in said housing;

a release cap for enclosing said first end of said housing and for receiving said mating tube therethrough; and, a unidirectional valve in said housing between said seal and said second end which closes to block fluid flow through said housing toward said first end thereof when said mating tube disengages said seal.

2. The connector according to claim 1, including a secondary retaining clip extending into said housing between said release cap and said mating tube, said secondary retaining clip including means for engaging a portion of said housing to releasably lock said secondary retaining clip to said housing.

3. The connector according to claim 2, wherein secondary retaining clip engages said mating tube to retain said mating tube in said housing.

4. The connector according to claim 3, wherein said means for engaging includes at least one resilient finger which is received within a recessed portion on the external surface of said housing.

5. The connector according to claim 4, wherein said recessed portion comprises a groove and wherein said resilient finger of said secondary retaining clip includes an inwardly directed portion received in said groove.

6. The connector according to claim 3, wherein said secondary retaining clip engages an upset bead portion of said mating tube.

7. The connector according to claim 1, wherein said primary retaining clip engages a upset bead portion of said mating tube.

8. The connector according to claim 1, wherein said valve comprises a duckbill seal which is opened by the forward end of said mating tube and which is closed when said mating tube is removed from said annular seal.

9. The connector according to claim 8, wherein aid duckbill seal is integrally formed with said annular seal.

10. The connector according to claim 8, including a resilient seal clip surrounding said duckbill seal for resiliently urging said duckbill seal into its closed position.

11. The connector according to claim 1, wherein said release cap is slidably mounted in said housing for movemen toward and away from said annular seal for engaging said at least one resilient finger of said primary retaining clip when said release cap is translated toward said annular seal thereby to deflect said at least one resilient finger of said primary retaining clip and permit removal of said mating tube from said housing.

12. A quick connector for connecting a mating tube to a fluid assembly, said connector comprising, in combination:

a connector housing having a first end for receiving a mating tube and a second end for terminating said housing into a fluid device;

a generally annular seal in said housing between said first and second ends for sealingly engaging said mating tube;

a primary retaining clip in said housing between said first end and said seal, said retaining clip having at least one inwardly directed resilient finger for engaging said mating tube to retain said mating tube in said housing;

6 a release cap for enclosing said first end of said housing and for receiving said mating tube therethrough; and, a secondary retaining clip extending into said housing between said release cap and said mating tube, said secondary retaining clip including means for engaging a portion of said housing to releaseably lock said secondary retaining clip to said housing said secondary retaining clip including first portions thereon extending into said housing and further including second portions received within an annular groove provided on the external surface of said housing.

13. The connector according to claim 12, wherein secondary retaining clip engages said mating tube to retain said mating tube in said housing.

14. The connector according to claim 13, wherein said means for engaging includes at least one resilient finger which is received within a recessed portion on the external surface of said housing.

15. The connector according to claim 14, wherein said recessedpportion comprises a groove and wherein said resilient finger of said secondary retaining clip includes an inwardly directed portion received in said groove.

16. The connector according to claim 13, wherein said secondary retaining clip engages an upset bead portion of said mating tube.

17. The connector according to claim 12, including a unidirectional valve in said housing between said seal and said second end to block fluid flow through said housing toward said first end thereof when said mating tube disengages said seal, wherein said primary retaining clip engages an upset bead portion of said mating tube.

18. The connector according to claim 12, wherein said valve comprises a duckbill seal which is opened by the forward end of said mating tube and which is closed when said mating tube is removed from said annular seal.

19. The connector according to claim 18, wherein aid duckbill seal is integrally formed with said annular seal.

20. The connector according to claim 18, including a resilient seal clip surrounding said duckbill seal for resiliently urging said duckbill seal into its closed position.

21. The connector according to claim 12, wherein said release cap is slidably mounted in said housing for movement toward and away from said annular seal for engaging said at least one resilient finger of said primary retaining clip when said release cap is translated toward said annular seal thereby to deflect said at least one resilient finger of said primary retaining clip and permit removal of said mating tube from said housing.

22. The connector according to claim 12 including a unidirectional valve in said housing between said seal and said second end to block fluid flow through said housing toward said first end thereof when said mating tube disengages said seal.

23. A connector for connecting a mating tube to a fluid assembly, said connector comprising, in combination:

a connector housing having a first end for receiving a mating tube and a second end for terminating said housing into a fluid device;

a seal in said housing between said first and second ends for sealing engaging said mating tube;

a primary retaining clip in said housing between said first end and said seal, said retaining clip having at least one inwardly directed resilient finger for engaging said mating tube to retain said mating tube in said housing;

a cap for enclosing said first end of said housing and for receiving said mating tube therethrough;

a secondary retaining clip extending into said housing between said release cap and said mating tube, said secondary retaining clip including means for engaging a portion of said housing to releasably lock said secondary retaining clip to said housing said secondary retaining clip further retaining said mating tube in said housing; and a unidirectional valve form at an end of said seal and extending inwardly into said housing and which closes to block fluid flow through said housing when said mating tube is removed from said housing.

24. The connector according to claim 23, including a unidirectional valve in said housing between said seal and said second end to block fluid flow through said housing toward said first end thereof when said mating tube disengages said seal.

* * * * *